(12) United States Patent
Isoda

(10) Patent No.: US 6,387,297 B1
(45) Date of Patent: May 14, 2002

(54) RARE EARTH FLUORIDE PHOSPHOR AND RADIOGRAPHIC INTENSIFYING SCREEN

(75) Inventor: Yuji Isoda, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/325,385

(22) Filed: Jun. 4, 1999

(30) Foreign Application Priority Data

Jun. 5, 1998 (JP) .......................................... 10-173949

(51) Int. Cl.$^7$ ............................................. C09K 11/08
(52) U.S. Cl. ............................ 252/301.4 H; 428/432; 428/696; 428/704; 428/691
(58) Field of Search ................. 252/301.4 H; 428/432, 428/696, 704, 690, 691

(56) References Cited

U.S. PATENT DOCUMENTS 4,761,347 A * 8/1988 Nakamura 4,835,398 A * 5/1989 Nakamura

* cited by examiner

Primary Examiner—Deborah Jones
Assistant Examiner—Wendy Boss
(74) Attorney, Agent, or Firm—Birch, Stewart, Kolasch & Birch, LLP

(57) ABSTRACT

A rare earth fluoride phosphor favorably employable for the incorporation into a radiographic intensifying screen has the following formula (I) or (II):

$$(Gd_{1-x}Ln_x)F_3 \cdot aMX \quad (I)$$

$$LnF_3 \cdot aMX{:}yA \quad (II)$$

in which Ln is Y, La or Lu; M is Na, K, Cs or Rb; X is F, Cl, Br or I; A is Ce, Tb or Bi; and a, x and y numbers satisfying the conditions of $0 < a \leq 0.03$ and $0 \leq x \leq 0.1$, $0 < y \leq 0.1$, respectively.

14 Claims, 2 Drawing Sheets

RARE EARTH FLUORIDE PHOSPHOR AND RADIOGRAPHIC INTENSIFYING SCREEN

FIELD OF THE INVENTION

The present invention relates to a rare earth fluoride phosphor giving UV luminescence, and a radiographic intensifying screen comprising the same.

BACKGROUND OF THE INVENTION

Radiography (radiation image-forming system), in which a radiographic intensifying screen comprising a phosphor is used in combination with a silver halide photosensitive material, is generally known. In the system, the screen is placed on the front and/or the back surface of the photosensitive material. The phosphor in the screen thus placed absorbs the radiation (such as X-rays) having passed through an object or having radiated from an object, and emits visible luminescence. Since the photosensitive material is exposed to both of the radiation and the luminescence, the radiation image is efficiently recorded on the photosensitive material and reproduced as a visible image by development. As the phosphor, a phosphor emitting visible luminescence when irradiated with the radiation has been conventionally employed. Examples of the phosphors include a calcium tungstate phosphor and rare earth activated alkaline earth metal fluoride halide phosphors.

The radiographic intensifying screen has a basic structure composed of a support and a phosphor layer provided thereon. If the phosphor layer is self-supporting, the support may be omitted. The phosphor layer usually comprises a binder and phosphor particles dispersed therein.

Recently, a radiographic intensifying screen comprising a phosphor giving UV luminescence around 400 nm as been proposed. In U.S. Pat. No. 4,225,653, for example, an intensifying screen comprising yttrium tantalate ($YTaO_4$) phosphor or its Gd-, Nb- or Tb-containing phosphor is disclosed. The photosensitive material used in combination with the screen emitting UV luminescence does not need to contain visible dyes (e.g., spectral sensitizing dyes, and dyes for cutting cross-over), and therefore its processing solutions such as a developer and a fixer are not polluted with the dyes oozing out of the photosensitive material in the course of the processing. Consequently, deposition of stain on the automatic processing machine can be reduced, and the maintenance of the developing system can be remarkably simplified. Further, since the photosensitive material is not stained with residual dyes, the development process can be favorably carried out in a relatively short time with a small amount of replenisher.

As the phosphor giving UV luminescence, lanthanide fluorides (e.g., $CeF_3$) and rare earth activated lanthanide fluorides (e.g., $LaF_3$:Ce, and $GdF_3$:Ce,Tb) are known. These phosphors are practically employed, for example, as scintillator.

The present inventor studied on phosphors giving UV luminescence suitable for the above radiation image-forming system, and found the following facts. Rare earth fluoride phosphors and their trivalent metal activated phosphors emit UV luminescence in a shorter wavelength region than yttrium tantalate ($YTaO_4$) phosphor, and hence they are very suitably used in combination with a silver chloride photographic emulsion having an intense absorption band at the shorter UV wavelength region. Accordingly, in addition to the above-described advantages of the system employing UV luminescence, the screen comprising those phosphors can substantially enhance the sensitivity of the photosensitive material so as to improve diagnostic performance without increasing the radiation dose.

As described above, the rare earth fluoride phosphors and their trivalent metal activated phosphors emit UV luminescence in a wavelength region suitable for the radiation image-forming system employing UV luminescence. However, the intensity of the luminescence is not fully satisfactory.

SUMMARY OF THE INVENTION

It is an object of the present invention to provide a rare earth fluoride phosphor emitting UV luminescence of improved intensity.

It is another object of the invention to provide a radiographic intensifying screen of high sensitivity giving UV luminescence in the wavelength region of 300 to 350 nm.

The present invention resides in a rare earth fluoride phosphor having the following formula (I):

$$(Gd_{1-x}Ln_x)F_3 \cdot aMX \qquad (I)$$

in which Ln is at least one rare earth element selected from the group consisting of Y, La and Lu; M is at least one alkali metal element selected from the group consisting of Na, K, Cs and Rb; X is at least one halogen selected from the group consisting of F, Cl, Br and I; and a and x are numbers satisfying the conditions of $0<a\leq0.03$ and $0\leq x\leq0.1$, respectively.

The invention also resides in a trivalent metal activated rare earth fluoride phosphor having the following formula (II):

$$LnF_3 \cdot aMX:yA \qquad (II)$$

in which Ln is at least one rare earth element selected from the group consisting of Y, La, Gd and Lu; M is at least one alkali metal element selected from the group consisting of Na, K, Cs and Rb; X is at least one halogen selected from the group consisting of F, Cl, Br and I; A is at least one trivalent metal element selected from the group consisting of Ce, Tb and Bi; and a and y are numbers satisfying the conditions of $0<a\leq0.03$ and $0<y\leq0.1$, respectively.

The invention further resides in a radiographic intensifying screen comprising the rare earth fluoride phosphor of the above formula (I) or the trivalent metal activated rare earth fluoride phosphor of the above formula (II).

DETAILED DESCRIPTION OF THE INVENTION

Figure 1:
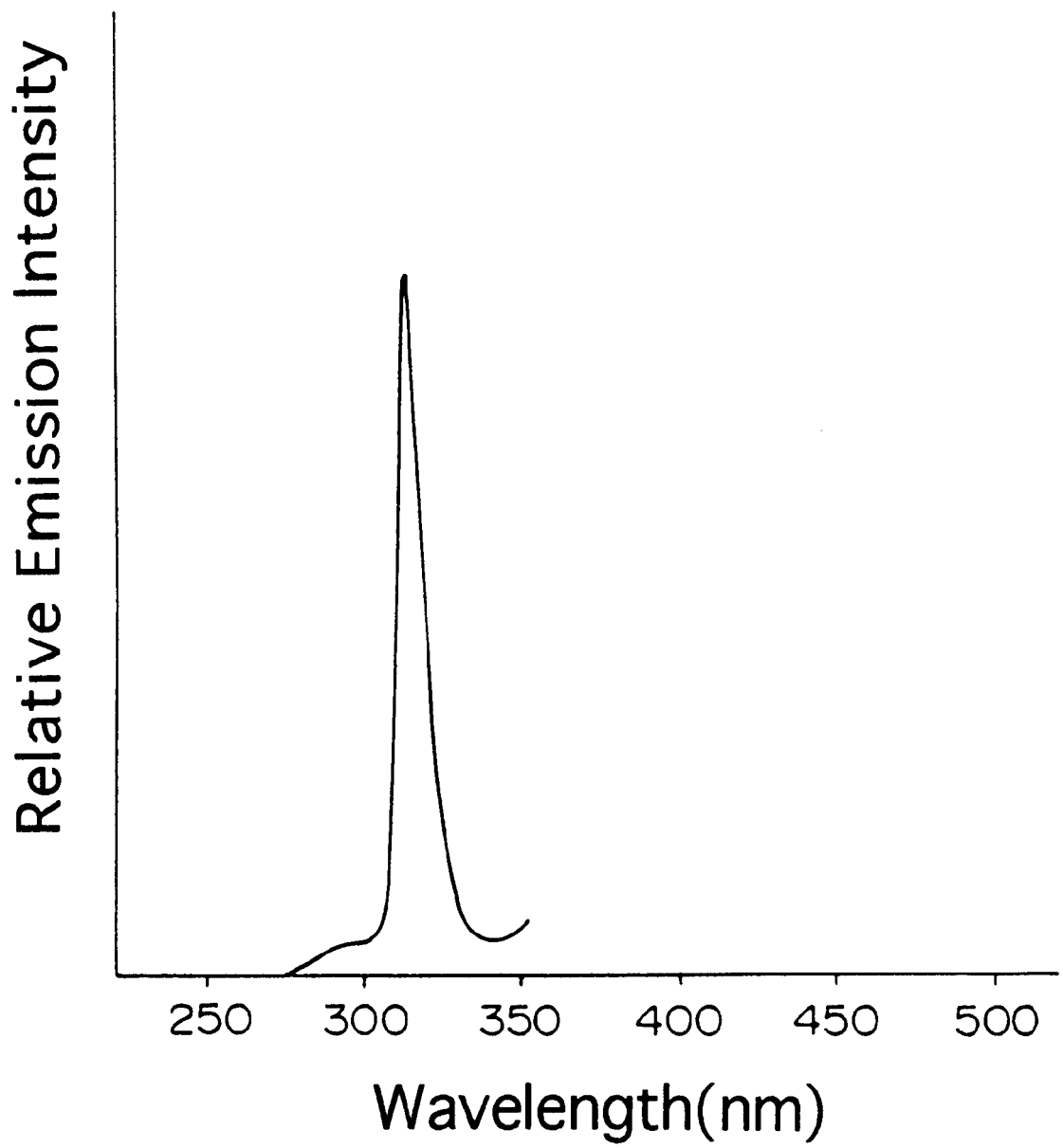
FIG. 1 shows the luminescence spectrum of $GdF_3 \cdot 0.01$ NaBr:0.01Ce phosphor of the invention which is given by excitation with X-rays.

The process for producing the rare earth fluoride phosphor of the invention is described below in detail.

Rare earth fluoride (precursor of the phosphor matrix), alkali metal halide, and if needed trivalent metal fluoride (activator) are pulverized and mixed well. The obtained mixture is placed in a heat-resistant container (e.g., a quartz boat, an alumina crucible, a quartz crucible), and then fired in an electric furnace. As the firing atmosphere, a nitrogen gas atmosphere is preferred. The temperature for the firing suitably is in the range of 1,100 to 1,300° C., and particularly preferred is around 1,200° C. The firing period is determined depending upon various conditions such as the amount of the mixture, the firing temperature, and the temperature at which the fired mixture (product) is taken out of the furnace. Generally, the firing period ranges from 1 to 6 hours, and preferably from 3 to 4 hours.

After the firing was complete, the furnace is allowed to stand for cooling and then the product is taken out of the furnace. The product is pulverized to prepare the aimed rare earth fluoride phosphor of the following formula (I) or (II):

(I)

(II)

In the formulas, each of Ln, M, X, A, a, x and y means the same as described above.

The phosphor of the invention is characterized by containing alkali metal halide (MX), and its content represented by "a" preferably satisfies the condition of $0.001 \leq a \leq 0.02$ which is effective to improve the luminescence intensity.

The radiographic intensifying screen of the invention comprises a phosphor layer containing the rare earth fluoride phosphor of the above formula (I) or (II). In addition to the above phosphor, the phosphor layer may further contain other phosphors and/or additives such as a colorant.

The phosphor layer can be formed on the support in the known manner described below. In the first place, the phosphor of the invention and a binder are added to a solvent, and well mixed to prepare a coating liquid in which the phosphor particles are uniformly dispersed in a binder solution. The ratio between the binder and the phosphor is determined according to the characteristics of the target screen and the nature of the phosphor. Generally, the ratio is in the range of 1:1 to 1:100 (binder:phosphor, by weight), preferably 1:8 to 1:40. The coating liquid thus prepared is evenly applied on the surface of the support to form a layer of the liquid. The coating procedure can be carried out using a known means such as a doctor blade, a roll coater, and a knife coater.

The support employed in the invention can be optionally selected from those employed in the conventional radiographic intensifying screens.

In the preparation of a known screen, one or more additional layers are occasionally provided between the support and the phosphor layer. For instance, an adhesive layer may be provided by applying a polymer material (e.g., gelatin) onto the phosphor layer-side surface of the support, so as to enhance the adhesion between the support and the phosphor layer. Further, a light-reflecting layer comprising light-reflecting material (e.g., titanium dioxide, aluminum, lead carbonate) or a light-absorbing layer comprising light-absorbing material (e.g., carbon black) may be provided in order to improve the sensitivity of the screen or the quality (sharpness, graininess) of an image given thereby, respectively. In the present invention, one or more of these additional layers may be provided. In addition, the support may contain the light-reflecting material or the light-absorbing material, or the phosphor layer-side surface of the support may be provided with protruded and depressed portions. Those may be adopted to the invention according to the characteristics of the target screen.

After applying the coating liquid onto the support to form a layer of the liquid, the formed layer is dried so as to complete the formation of a phosphor layer. The thickness of the phosphor layer varies depending upon such conditions as the characteristics of the target screen, the nature of the phosphor, and the ratio between the binder and the phosphor. Generally, the thickness of the phosphor layer is in the range of 20 μm to 1 mm, preferably 50 to 500 μm.

By the methods other than the above method, the phosphor layer can be formed on the support. For instance, the phosphor layer is initially prepared on a false support (e.g., a glass plate, a metal plate, a plastic sheet) by applying the above coating liquid in the above manner, and then thus prepared phosphor layer is overlaid and fixed on the genuine support by pressing or using an adhesive agent.

On the phosphor layer, a protective film is preferably placed to keep the phosphor layer from chemical deterioration or physical shock. The protective film can be prepared by coating the surface of the phosphor layer with a solution in which an organic polymer (e.g., polyamide resin, acrylic resin, fluorocarbon resin) hardly absorbing UV light is dissolved in an appropriate solvent. Alternatively, a sheet of the above polymer material or a transparent glass plate beforehand prepared may be overlaid and fixed on the phosphor layer with adhesive agent. Further, a protective film of inorganic material hardly absorbing UV light may be formed on the phosphor layer by deposition process. Any of these protective films may have a surface subjected to embossing treatment, and the film may contain additive materials hardly absorbing UV light. Examples of the additive materials include a light-scattering material (e.g.,. gadolinium fluoride, barium fluoride, and gadolinium oxide). In addition, a smoothing agent and an electroconductive agent may be incorporated.

In the manner described above, the radiographic intensifying screen of the invention comprising a support and the phosphor layer provided thereon can be produced. The phosphor layer of the screen thus produced comprises a binder and a rare earth fluoride phosphor of the formula (I) and/or (II) dispersed therein.

EXAMPLES

Example 1

Gadolinium Fluoride Phosphor 10 g (0.047 mol) of $GdF_3$ and 0.1 g ($9.72 \times 10^{-4}$ mol) of NaBr were pulverized and mixed well in a mortar, and the mixture was placed in a plastic bottle. The bottle was shaken well for uniformly mixing the mixture, and the resulting mixture was charged in an alumina crucible. After the crucible was placed in an electric furnace, the furnace was evacuated for 30 minutes and then nitrogen gas was introduced into the furnace, until the gas pressure reached to 1 atm. The temperature in the furnace was then elevated to 1,200° C. at the rate of 20° C./minute, and at that temperature the mixture was fired for 3 hours. After the firing was complete, the furnace was cooled at a rate of 20° C./minute to room temperature. The product was taken out of the furnace, and pulverized in a mortar to prepare sodium bromide-containing gadolinium fluoride [$GdF_3 \cdot 0.01$ NaBr] phosphor of the invention.

Comparison Example 1

Gadolinium Fluoride Phosphor

The procedure of Example 1 was repeated except for not adding NaBr, to prepare gadolinium fluoride [GdF3] phosphor for comparison.

Example 2

Cerium Activated Gadolinium Fluoride Phosphor

The procedure of Example 1 was repeated except for mixing 10 g (0.047 mol) of $GdF_3$, 0.093 g ($4.67 \times 10^{-4}$ mol) of $CeF_3$, and 0.3 g ($2.92 \times 10^{-3}$ mol) of NaBr, to prepare cerium activated sodium bromide-containing gadolinium fluoride [GdF$_3$·0.03NaBr:0.01Ce] phosphor of the invention.

Example 3
Cerium Activated Gadolinium Fluoride Phosphor

The procedure of Example 2 was repeated except for using 0.1 g (9.72×10$^{-4}$ mol) of NaBr, to prepare cerium activated sodium bromide-containing gadolinium fluoride [GdF$_3$·0.01NaBr:0.01Ce] phosphor of the invention.

Example 4
Cerium Activated Gadolinium Fluoride Phosphor

The procedure of Example 2 was repeated except for using 0.01 g (9.7×10$^{-5}$ mol) of NaBr, to prepare cerium activated sodium bromide-containing gadolinium fluoride [GdF$_3$·0.001NaBr:0.01Ce] phosphor of the invention.

Comparison Example 2
Cerium Activated Gadolinium Fluoride Phosphor

The procedure of Example 2 was repeated except for not adding NaBr, to prepare cerium activated gadolinium fluoride [GdF$_3$:0.01Ce] phosphor for comparison.

Comparison Example 3
Cerium Activated Gadolinium Fluoride Phosphor

The procedure of Example 2 was repeated except for using 1 g (9.72×10$^{-3}$ mol) of NaBr, to prepare cerium activated sodium bromide-containing gadolinium fluoride [GdF$_3$·0.1NaBr:0.01Ce] phosphor for comparison.

Example 5
Lanthanum Activated Gadolinium Fluoride Phosphor

The procedure of Example 1 was repeated except for mixing 10 g (0.047 mol) of GdF$_3$, 0.092 g (4.7×10$^{-4}$ mol) of LaF$_3$, and 0.1 g (9.7×10$^{-4}$ mol) of NaBr, to prepare lanthanum activated sodium bromide-containing gadolinium fluoride [(Gd$_{0.99}$La$_{0.01}$)F$_3$·0.01NaBr] phosphor of the invention.

Comparison Example 4
Lanthanum Activated Gadolinium Fluoride Phosphor

The procedure of Example 5 was repeated except for not adding NaBr, to prepare lanthanum activated gadolinium fluoride [(Gd$_{0.99}$La$_{0.01}$)F$_3$] phosphor for comparison.

Evaluation of Phosphor

The luminescence emitted by each of the above-prepared phosphor was evaluated in the following manner.

Each of the above-prepared phosphors was charged in a sample holder, and the holder was installed in a spectrophotometer (F-4100 [trade name], available from Hitachi, Ltd.). With the sample exposed to X-rays generated by a W-tube (40 KVp, 30 mA), the UV luminescence was measured. The intensity of the luminescence at 315 nm was measured in a relative value under the condition that the peak intensity (at approx. 315 nm) of the luminescence emitted by GdF$_3$ phosphor (Comparison Example 1) was set at 100. The results are set forth in Table 1, FIG. 1 and FIG. 2.

TABLE 1

| phosphor | | relative intensity |
|---|---|---|
| Ex. 1 | GdF$_3$·0.01NaBr | 117 |
| C.Ex. 1 | GdF$_3$ | 100 |
| Ex. 2 | GdF$_3$·0.03NaBr: 0.01Ce | 120 |
| Ex. 3 | GdF$_3$·0.01NaBr: 0.01Ce | 133 |

TABLE 1-continued

| phosphor | | relative intensity |
|---|---|---|
| Ex. 4 | GdF$_3$·0.001NaBr: 0.01Ce | 128 |
| C.Ex. 2 | GdF$_3$: 0.01Ce | 119 |
| C.Ex. 3 | GdF$_3$·0.1NaBr: 0.01Ce | 59 |
| Ex. 5 | (Gd$_{0.99}$La$_{0.01}$)F$_3$·0.01NaBr | 126 |
| C.Ex. 4 | (Gd$_{0.99}$La$_{0.01}$)F$_3$ | 87 |

Figure 2:
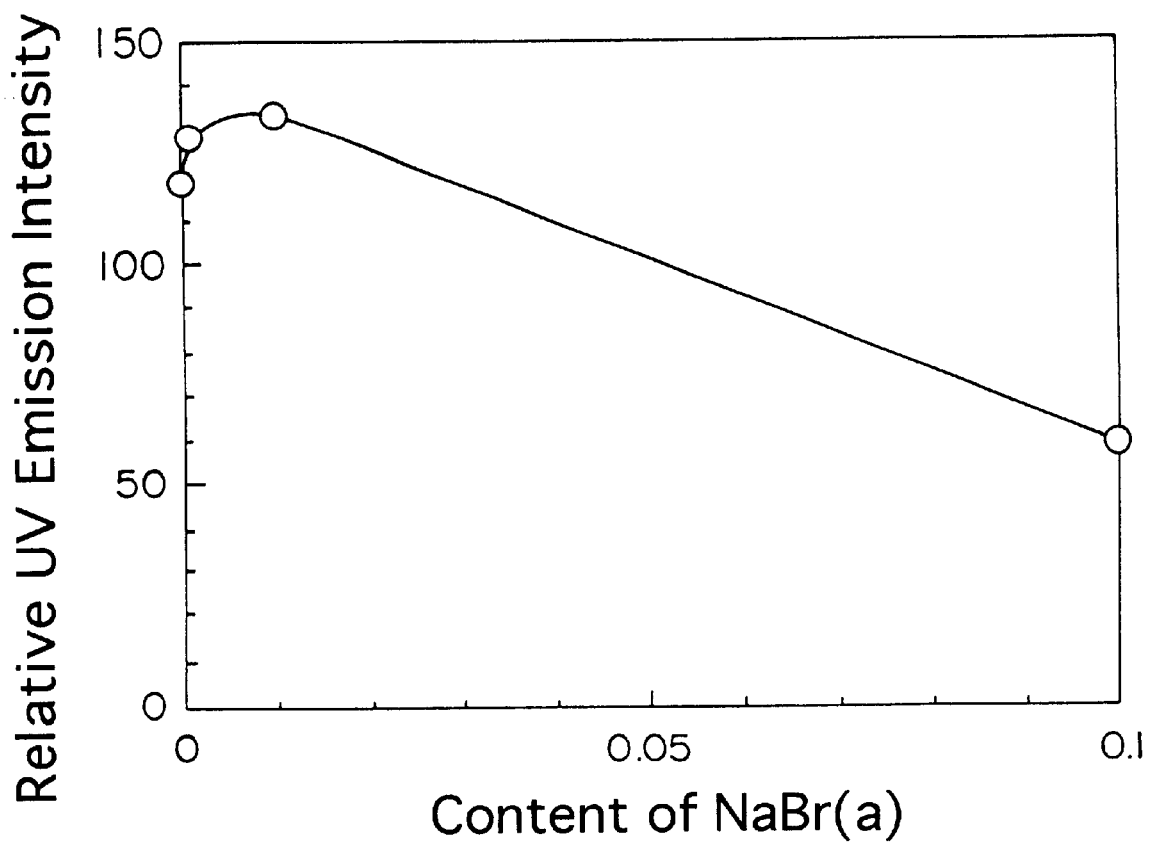
FIG. 2 shows a relation between "a" (the content of NaBr) in $GdF_3 \cdot aNaBr:0.01Ce$ phosphor and the relative intensity of its UV luminescence.

FIG. 1 shows the luminescence spectrum of GdF$_3$·0.01 NaBr:0.01Ce phosphor (Example 3) which was obtained by excitation with X-rays, and FIG. 2 shows a relation between "a" (the content of NaBr) in GdF$_3$·aNaBr:0.01Ce phosphor and the relative intensity of its UV luminescence.

The spectrum in FIG. 1 shows that GdF$_3$·0.01NaBr:0.01Ce phosphor of the invention emits the luminescence in the UV region of 300 to 330 nm and that its luminescence peak is located at approx. 315 nm. Further, the results in Table 1 indicate that each phosphor containing NaBr (the phosphor of the invention) emits the luminescence of remarkably improved intensity, as compared with the corresponding phosphor not containing NaBr (the conventional phosphor). FIG. 2 also indicates that the intensity of the UV luminescence is remarkably increased when "a" in the formula (i.e., the content of NaBr) satisfies the condition of 0<a≦0.03 (particularly 0.001≦a≦0.02).

What is claimed is:

1. A rare earth fluoride phosphor having the following formula (I):

$$(Gd_{1-x}Ln_x)F_3 \cdot aMX \tag{I}$$

in which Ln is at least one rare earth element selected from the group consisting of Y, La and Lu; M is at least one alkali metal element selected from the group consisting of Na, K, Cs and Rb; X is at least one halogen selected from the group consisting of F, Cl, Br and I; and a and x are numbers satisfying the conditions of 0<a≦0.03 and 0≦x≦0.1, respectively.

2. The rare earth fluoride phosphor of claim 1, wherein M and X in the formula (I) are Na and Br, respectively.

3. A trivalent metal activated rare earth fluoride phosphor having the following formula (II):

$$LnF_3 \cdot aMX:yA \tag{II}$$

in which Ln is at least one rare earth element selected from the group consisting of Y, La, Gd and Lu; M is at least one alkali metal element selected from the group consisting of Na, K, Cs and Rb; X is at least one halogen selected from the group consisting of F, Cl, Br and I; A is at least one trivalent metal element selected from the group consisting of Ce, Tb and Bi; and a and y are numbers satisfying the conditions of 0<a≦0.03 and 0<y≦0.1, respectively.

4. The trivalent metal activated rare earth fluoride phosphor of claim 3, wherein M and X in the formula (II) are Na and Br, respectively.

5. The trivalent metal activated rare earth fluoride phosphor of claim 3, wherein Ln in the formula (II) is Gd.

6. The trivalent metal activated rare earth fluoride phosphor of claim 3, wherein A in the formula (II) is Ce.

7. A radiographic intensifying screen comprising the rare earth fluoride phosphor of claim 1.

8. A radiographic intensifying screen comprising the trivalent metal activated rare earth fluoride phosphor of claim 3.

9. The trivalent metal activated rare earth fluoride phosphor according to claim 3, wherein Ln is at least one rare earth element selected from the group consisting of Y, Gd and Lu.

10. The trivalent metal activated rare earth fluoride phosphor according to claim 3, wherein Ln is Gd.

11. The trivalent metal activated rare earth fluoride phosphor according to claim 3, wherein M is at least one alkali metal element selected from the group consisting of Na, K and Rb.

12. The trivalent metal activated rare earth fluoride phosphor according to claim 3, wherein Ln is Gd and M is Na.

13. The trivalent metal activated rare earth fluoride phosphor according to claim 3, wherein Ln is Gd, M is Na, and A is Ce.

14. The trivalent metal activated rare earth fluoride phosphor according to claim 3, wherein the phosphor luminesces in a wavelength region of 300 to 350 nm.

* * * * *